May 6, 1930. C. H. DESAUTELS 1,757,113
TIRE FINISHING MACHINE
Filed May 22, 1926 2 Sheets-Sheet 1
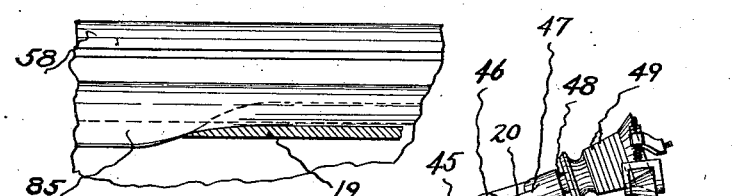
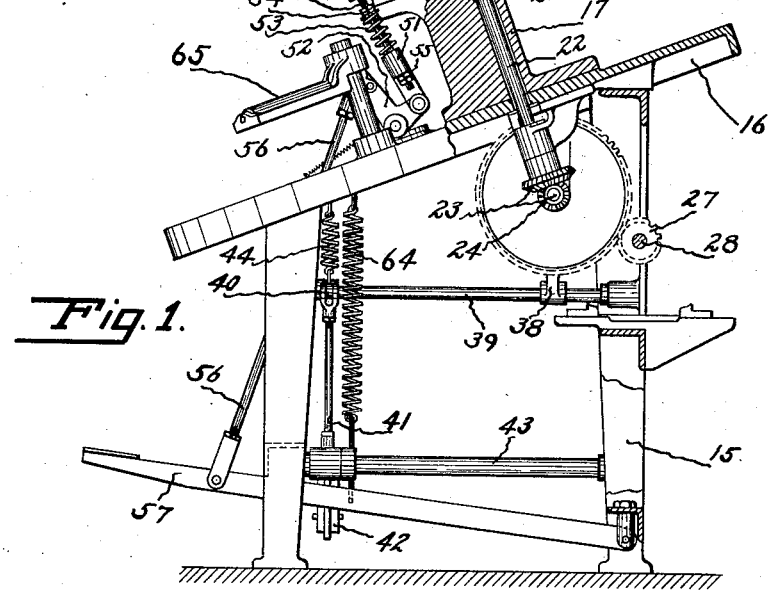
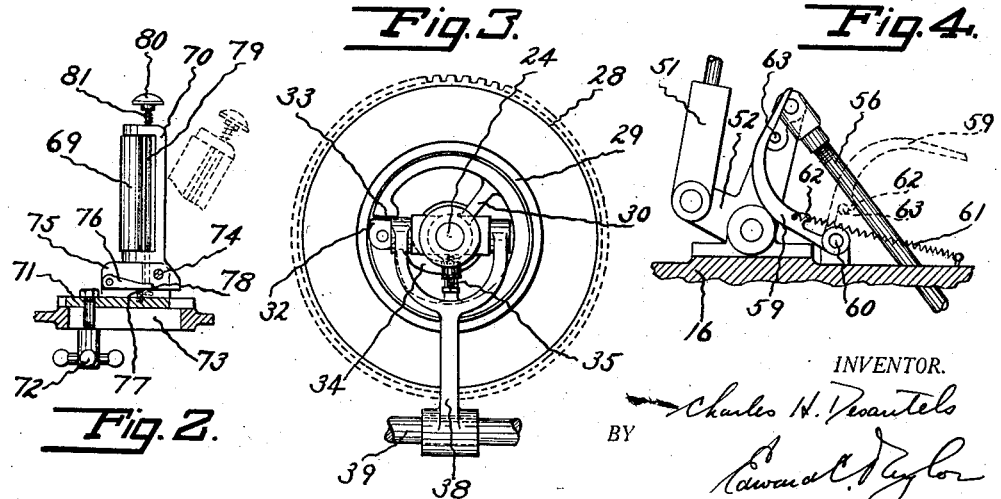
INVENTOR.
Charles H. Desautels
BY
Edward C. Taylor
ATTORNEY.

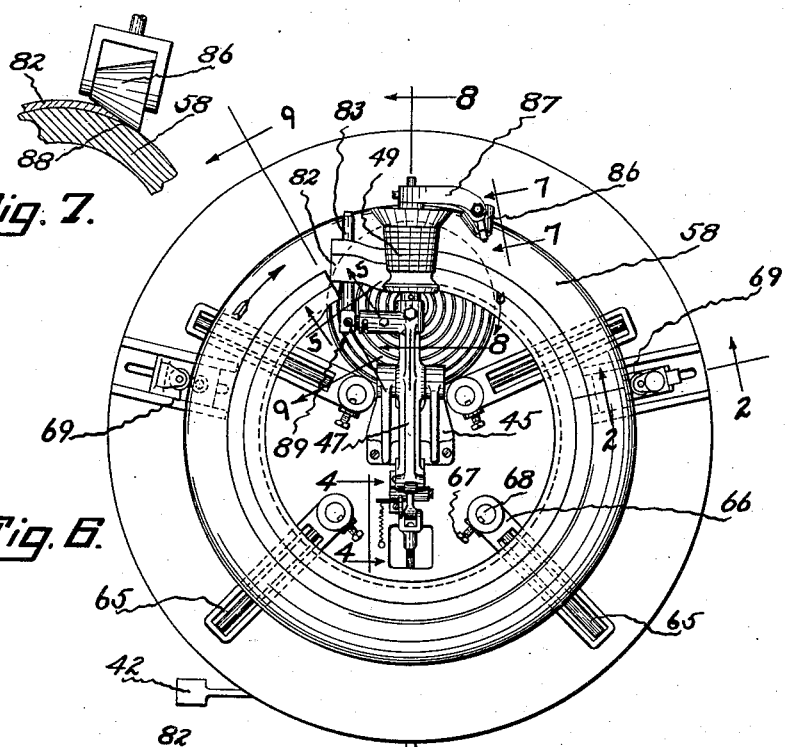

Patented May 6, 1930

1,757,113

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

TIRE-FINISHING MACHINE

Application filed May 22, 1926. Serial No. 110,878.

This invention relates to a machine for finishing pneumatic tires. By "finishing" is meant the application of the covering rubber, such as the sidewalls and chafing strips, to the carcass of the tire casing.

The object of the invention is to provide a machine of this character which will guide and apply sidewall and chafing strips to the tire carcass with rapidity and accuracy. A further object is to provide a machine which will automatically turn the chafing strip around and inside of the bead of the tire. Another object is to provide a machine for applying a strip of sidewall stock and stitching the edge of this stock into firm adherence with the underlying tire carcass.

Referring to the drawings,—

Fig. 1 is a side elevation of the machine, partly in section;

Fig. 2 is a detail taken substantially on line 2—2 of Fig. 6;

Fig. 3 is a detail of a clutch mechanism;

Fig. 4 is a detail of a latch mechanism, taken along line 4—4 of Fig. 6;

Fig. 5 is a detail of a tire casing in process of finishing, illustrating the manner in which the chafing strip is turned under the bead, and taken on line 5—5 of Fig. 6;

Fig. 6 is a top plan view of the machine;

Fig. 7 is a detail taken along line 7—7 of Fig. 6;

Fig. 8 is a section taken along line 8—8 of Fig. 6;

Fig. 9 is a section taken along line 9—9 of Fig. 6;

Fig. 10 is a detail of the clutch mechanism, being a central section of the parts shown in Fig. 3;

Fig. 11 is a fragmentary section of the bead portion of a tire casing, showing the condition of the tire at a period intermediate of the operations shown in Figs. 8 and 9; and Fig. 12 is a similar section of a completed tire.

The machine is mounted upon a base 15 having at the top a slanting table 16. A pedestal 17 upon this table carries a bearing 18 having a disk 19, the upper surface of which is shaped as a flat cone 20. This disk is connected by gearing 21 with a shaft 22 passing through the pedestal and connected by bevel gearing 23 with a transverse shaft 24.

The shaft 24 is driven by suitable clutch mechanism so as to be at all times under the control of the operator. In the form shown the shaft derives its motion from a gear 25 loosely mounted upon a sleeve 26 upon the shaft and meshing with a pinion 27 (Fig. 1) upon a shaft 28 driven by a motor or other suitable source of power. Gear 25 has a hub 29 (Figs. 3 and 10) having a friction surface on its inner periphery. Keyed to shaft 24 is a hub 30 carrying a split brake band 31. A cam member 32 is pivoted to this hub and operates upon an abutment 33 at one side of the split in the brake band, so that when the cam is rocked the brake band will be forced outwardly into firm engagement with the inner periphery of the hub 29. In order to rock the cam member it is provided with an arm 34 carrying at one end an adjusting screw 35 striking upon a cone surface 36 of a shipper member 37. If this member is forced to the right as viewed in Fig. 10, the arm 34 will be forced downwardly and the brake band cammed out into contact with the hub. A shipper lever 38 is carried upon a rock shaft 39 to which is secured an arm 40. A link 41 joins this arm to a treadle 42 pivoted upon a shaft 43. A spring 44 holds the treadle inactive so that the machine will not be driven unless the operator rests his foot upon the treadle.

The pedestal 17 carries a bracket 45 (Figs. 1 and 6) to which is pivoted at 46 a rocking arm 47. This arm has a cylindrical extension 48 upon which are mounted small rollers 49 serving, together, to make up a roll adapted to press against the outer surface of the tire. The purpose of forming this roll in sections is to accommodate the different surface speeds with which different circumferences of the tire move when the tire is rotated about its axis. The sections are shaped so as to give an even contact with the outer circumference of the tire, and with one exception their specific contour need not be discussed.

When the machine is being operated the tire wall is clamped between the roll sections 49 and the disk 19, as shown in Fig. 8. When work upon the tire has been finished the roll sections 49 are moved upwardly by swinging the arm 47 into the position of Fig. 1. In order to swing this arm it is provided with a rod 50 running loosely in a bearing block 51 pivoted to a bell crank 52. A spring 53 is compressed between the bearing block and washer 54 secured to the rod 50, so that at all times the rear end of arm 47 is urged upwardly. Lock nuts 55 are preferably attached to the bottom of the rod to give a limit to this motion. To the other arm of the bell crank 52 is pivoted a rod 56 joined to a treadle 57. By depressing this treadle the arm 47 can be tilted so as to press the roll sections 49 down against the tire 58, which is carried upon the disk 19. A yielding pressure will be exerted due to the spring 53.

In order to avoid the necessity of the operator holding his foot upon the treadle 57 throughout the operation of the machine, I prefer to supply a latch mechanism. In the form of latch shown in Fig. 4 a latch-piece 59 is pivoted at 60 to the table 16, and is constantly urged toward the dotted line position of Fig. 4 by a spring 61. The latch-piece is shaped as at 62 to receive a pin 63 on the bell crank 52. The parts are shown in dotted lines in the position at which the treadle is held down, and the roll sections 49 in contact with the tire. In order to release the roll sections from the tire the latch-piece is drawn back into the full line position, allowing a spring 64 to return the treadle and consequently the roll sections to their upper positions.

The main working support for the tire is furnished by the disk 19 which enters into the tire and gives a bearing surface for the tire's inner surface. At other points the tire is held by rollers 65 mounted in frames 66 secured by set screws 67 to posts 68 on the table. The height of these rollers can be adjusted on the posts to accommodate tires of different size.

The tire is centralized by a pair of rolls 69 carried in frames 70 which are mounted upon slides 71 (Fig. 2) secured by adjusting screws 72 in slots 73 formed in the table. At least one of these rolls is preferably made so that it may be tilted out of its normal position at right angles to the table to facilitate the removal and replacement of a tire casing. The frame 70 supporting the roll in question is pivoted at 74 between blocks 75 secured to the slide 71. A latch 76, also pivoted to the blocks, is normally pressed by a spring 77 into a shoulder 78 in the frame 70. The latch may be depresesd by a rod 79 and the frame tilted into the position shown in dotted lines in Fig. 2. The rod preferably has a button head 80 and is held in its upward position by a spring 81.

In operation the strip of covering material 82 is led over a guide roll 83 (Fig. 6) to a point between the tire and the roll sections 49, the tire being meanwhile clamped between the disk 19 and the roll sections. As the tire is rotated the covering rubber will be pressed against the tire. If the machine is being used to apply a chafing strip or a combined sidewall and chafing strip, it will operate automatically to turn this strip around and under the bead. In this case the strip 82 is of sufficient width to extend beyond the bead of the tire, as best shown in Fig. 8. A flanged portion 84 (Fig. 8) of the roll sections turns this projecting portion partially around the bead of the tire so that after the tire has passed beyond the disk 19 this free edge will project below the bead, as indicated at 85 in Fig. 11. After the tire has made a complete revolution this projecting portion 85 will again meet the edge of the disk, as indicated in Figs. 5 and 9. Since the disk is of smaller diameter than the tire, and is rotating in the same direction, the edge of the disk has a motion at the point where it first contacts with the tire in a direction almost radial of the latter. This is apparent in viewing the apparatus in plan as in Fig. 6. Fig. 5 shows the manner in which the edge of the disk 19 turns this projecting portion 85 under the bead, a somewhat later stage being shown in Fig. 9. Fig. 12 shows the chafing strip completely applied. It will be observed that, due to the conical shape of the top of the disk, the tire wall will be bent upwardly around the disk in an even curve and that the disk will give a firm support to the tire wall due partially to its shape and partially to its position. The disk therefore serves to perform the functions both of a supporting device and of a turning and pressing device for the edge of the chafing strip. The wiping action which the disk exerts in tucking the edges of the chafing strip around the bead is particularly beneficial in getting a smooth lay of the material around the bead.

It is preferable to provide also mechanism for attaching firmly to the tire carcass the outer edge of the material 82 which, in the case shown, is a combined strip of sidewall rubber and chafing strip fabric. For this purpose a roller 86 of conical shape is journaled in a supporting arm 87 secured to the outer end of arm 47. The axis of the roll 86 is preferably set at an angle to a line drawn radially of the tire, and the small end of the roll is pointed inwardly. This construction gives a wiping action outwardly of the tire as well as a pressing action on the edge of the covering rubber. The effect of these combined actions is to bevel off the edge 88 as shown in Fig. 7 and to press this edge firmly into adherence with the underlying tire carcass.

The manner of operating the device will be clear from the above. With the roll sections 49 in their upper position, as in Fig. 1, a tire is inserted resting on the rolls 65 and held laterally by rolls 69. Treadle 57 is then depressed to bring the roll sections 49 tightly against the wall of the tire, pinching this between the roll sections and the disk 19. The treadle will be held in this depressed position by the latch mechanism shown in Fig. 4. Treadle 42 is then depressed to cause the disk 19 to rotate, causing the tire and the roll sections 49 to rotate also. The stock 82 is fed between the roll sections 49 and the tire carcass, the machine being stopped if desired near the end of a complete rotation to permit the strip to be trimmed accurately to length. If a chafing strip intended to be folded around the bead is being applied, the rotation of the tire is then continued for another revolution, the disk 19 serving to tuck the edge of the chafing strip around the bead as described. After the completion of the finishing operation the latch 59 is released and the treadle 57 permitted to rise, this releasing the tire from the gripping action of the roll sections 49 and disk 19. The tire may then be reversed to operate upon the other side. During the removal and replacement of a tire, one or more of the vertical rolls 69 may be tilted as shown in Fig. 2, and the guide 83 is swung to a vertical position. This is permitted by a hinged connection 89 with the arm 47. The tire 58 has been shown in the drawings as supported upon an annular fluid pressure bag 90, but the machine is equally applicable to use with tires having no bag inside of them.

Having thus described my invention, I claim:

1. A tire finishing machine comprising a plurality of rollers arranged in one plane with their axes radiating from a common point and adapted to support a tire casing on one side, a plurality of rollers arranged with their axes at right angles to said plane and adapted to contact with the outer periphery of the tire casing, a cone-faced disk mounted with its axis substantially at right angles to said plane in such a position as to extend into the inside of the tire casing and furnish support to one interior wall thereof, and a roller bearing upon the outer surface of the tire wall opposite said disk.

2. A tire finishing machine comprising a plurality of rollers arranged in one plane with their axes radiating from a common point and adapted to support a tire casing on one side, a plurality of rollers arranged with their axes at right angles to said plane and adapted to contact with the outer periphery of the tire casing, a cone-faced disk mounted with its axis substantially at right angles to said plane in such a position as to extend into the inside of the tire casing and furnish support to one interior wall thereof, and a roller bearing upon the outer surface of the tire wall opposite said disk, said roller having a projecting flange thereon serving to deflect inwardly a strip of material applied to the sidewall of the tire.

3. A tire finishing machine comprising a rotatable disk adapted to project inside the tire and furnish support to an interior wall thereof, and simultaneously to exert a wiping action from the edge of the bead inwardly of the tire.

4. A tire finishing machine comprising a disk having its axis substantially parallel with the axis of the tire, said disk being adapted to project inside the tire casing and furnish support for one interior wall thereof, and means for rotating the disk, whereby the tire is progressively advanced and the disk exerts a wiping action from the edge of the bead inwardly of the tire.

5. A tire finishing machine comprising a disk having one surface formed as a flat cone, means for rotatably supporting the disk in a position to project inside a tire casing with one inner wall of the tire supported by the conical face of the disk, a roll having its axis substantially at right angles to the axis of the disk and arranged to press the tire against the disk, and means for rotating the disk.

6. A tire finishing machine comprising a disk having one surface formed as a flat cone, means for rotatably supporting the disk in a position to project inside a tire casing with one inner wall of the tire supported by the conical face of the disk, a roll having its axis substantially at right angles to the axis of the disk and arranged to press the tire against the disk, means for rotating the disk to feed the tire wall between it and the roll, and means for turning partially around the bead of the tire a strip of covering material, whereby the strip is projected into the path of the disk and is wiped by the disk onto the inner surface of the tire.

CHARLES H. DESAUTELS.